United States Patent [19]

Gacs et al.

[11] 3,722,017
[45] Mar. 27, 1973

[54] OVER-THE-WING AIRCRAFT LOADING BRIDGE

[75] Inventors: Peter T. Gacs, Palos Verdes Peninsula; Lucien C. Williams, Palos Verdes Estates, both of Calif.

[73] Assignee: General Steel Industries, Inc., St. Louis, Mo.

[22] Filed: July 26, 1971

[21] Appl. No.: 165,511

[52] U.S. Cl. ........................................... 14/71
[51] Int. Cl. .................................... B65g 11/00
[58] Field of Search ................... 14/71, 72, 42, 36

[56] References Cited

UNITED STATES PATENTS

| | | |
|---|---|---|
| 2,875,457 | 3/1959 | Read ................................ 14/71 |
| 1,170,702 | 2/1916 | Strauss ............................ 14/42 |
| 3,538,529 | 11/1970 | Breier ............................. 14/71 |
| 3,358,308 | 12/1967 | Henchbarger .................... 14/71 |
| 3,412,412 | 11/1968 | Kjerulf ............................ 14/71 |
| 3,462,787 | 8/1969 | Seipos ............................ 14/71 |
| 3,543,318 | 12/1970 | Tushim ........................... 14/71 |
| 3,524,207 | 8/1970 | Giarretto ......................... 14/71 |
| 3,404,417 | 10/1968 | Wollard .......................... 14/71 |
| 3,184,772 | 5/1965 | Moore ............................ 14/71 |
| 3,581,331 | 6/1971 | Fisher ............................ 14/71 |

*Primary Examiner*—Nile C. Byers, Jr.
*Attorney*—Bedell & Burgess

[57] ABSTRACT

A bridge for transferring passengers between airport terminal buildings and access doors of aircraft located rearwardly of the aircraft wing has a main passageway member pivotally supported at the terminal building end on vertical and transverse axes and intermediate its ends on a track mounted rack propelled carriage on which it is elevatable and depressable by a combined hydraulic and screw jack system so that its outer end portion, slightly arched, may extend over the wing. At its outer end the main passageway mounts a lateral passageway for pivotal movement about a vertical axis and vertical movement about a horizontal axis of the lateral passageway. The lateral passageway mounts an outer end unit containing an operator's cab, for pivotal movement about a vertical axis to positions parallel to aircraft fuselages. The outer end unit contains an extendible canopy for sealing engagement with the fuselage side.

7 Claims, 18 Drawing Figures

PATENTED MAR 27 1973 3,722,017

INVENTORS:
PETER T. GACS
LUCIEN C. WILLIAMS
BY: Bedell & Burgess
ATTORNEYS

INVENTORS:
PETER T. GACS
LUCIEN C. WILLIAMS
BY: Bedell & Burgess
ATTORNEYS

INVENTORS:

PETER T. GACS
LUCIEN C. WILLIAMS

BY: *Bedell & Burgess*

ATTORNEYS

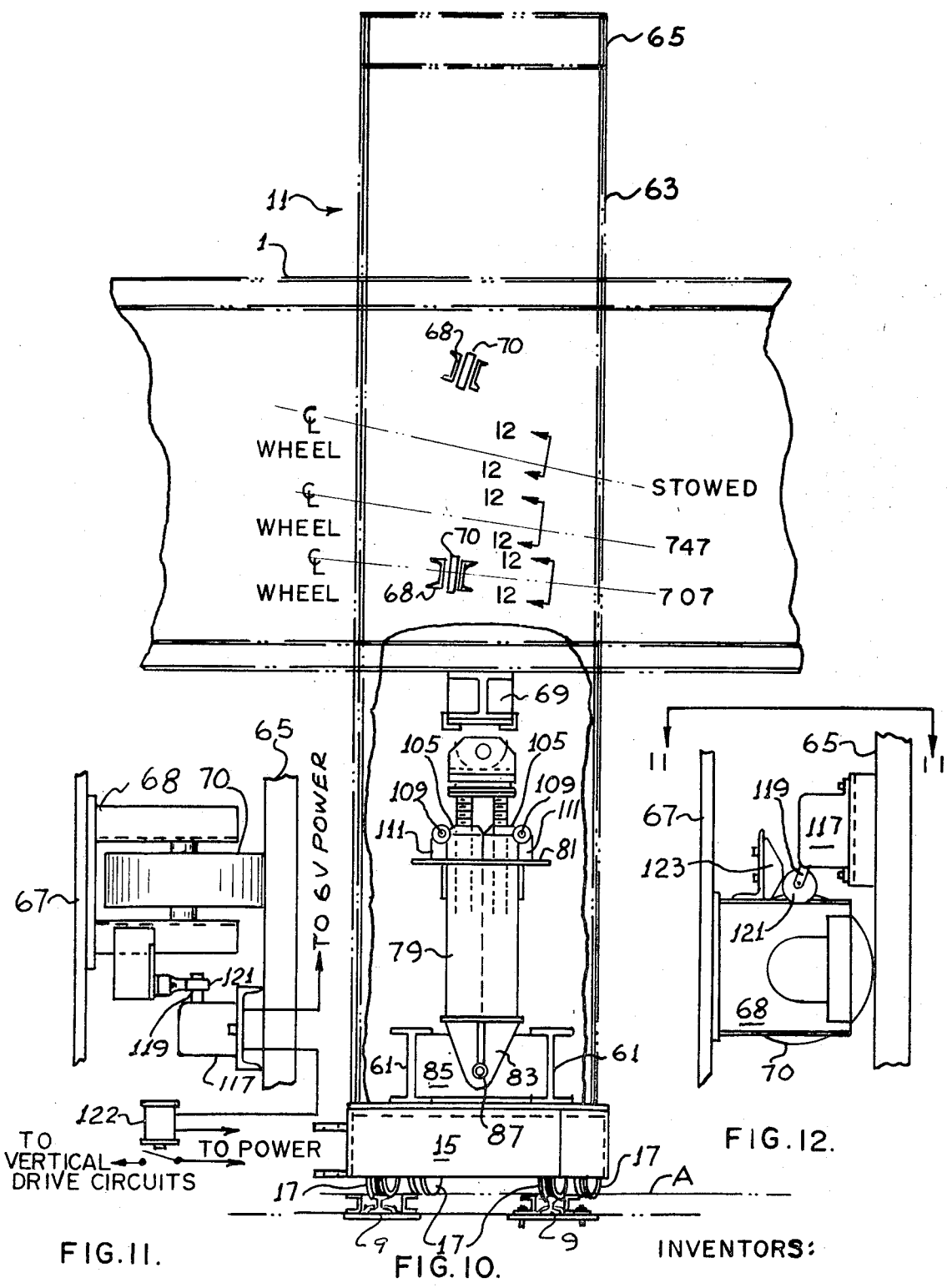

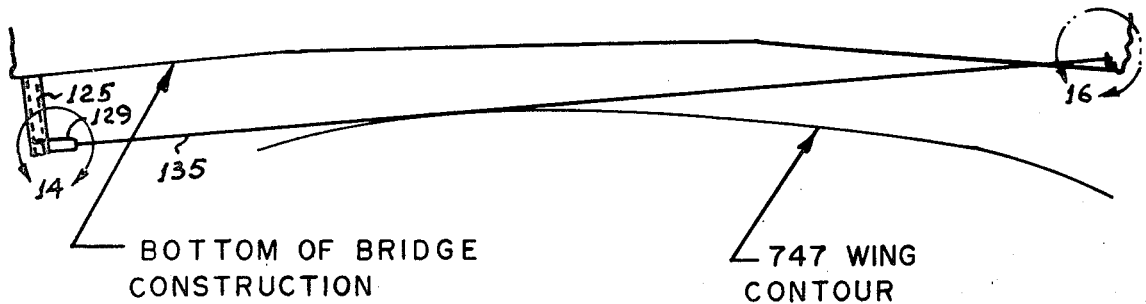
BOTTOM OF BRIDGE CONSTRUCTION
747 WING CONTOUR
FIG. 13
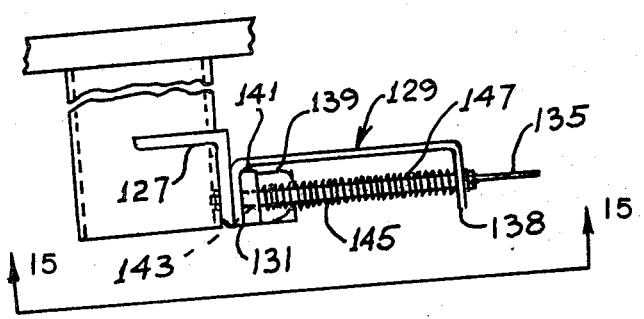
FIG. 14.
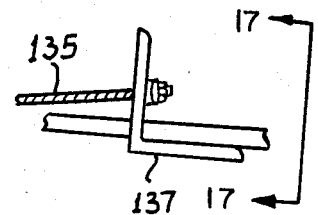
FIG. 16.
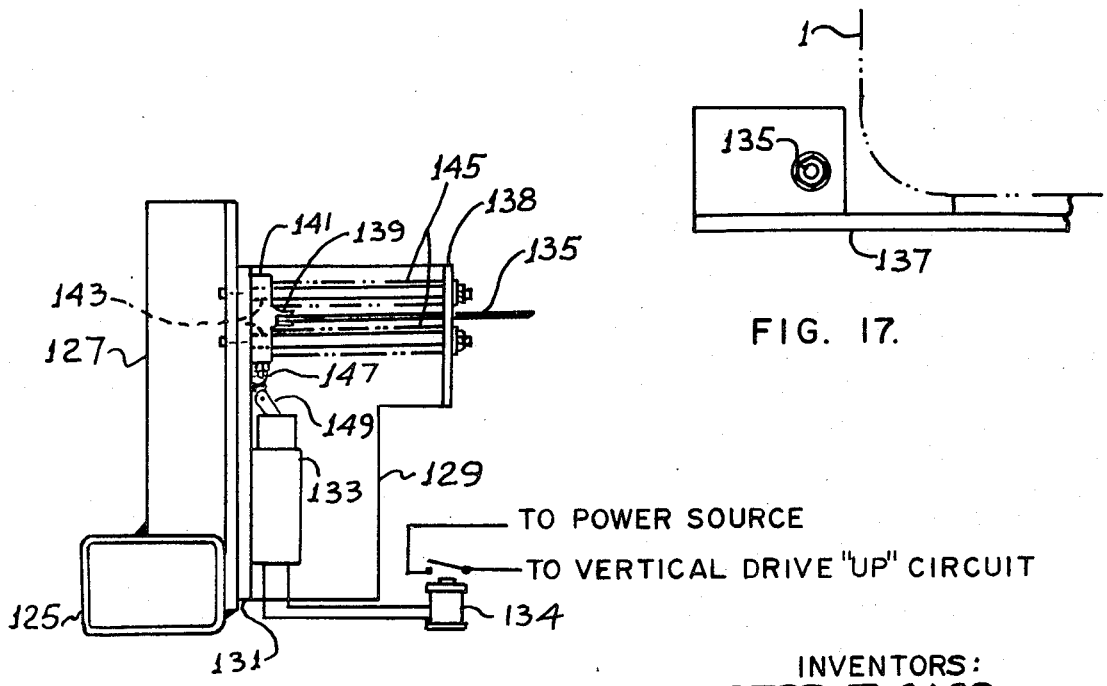
FIG. 15.
FIG. 17.
INVENTORS:
PETER T. GACS
LUCIEN C. WILLIAMS
BY: Bedell & Burgess
ATTORNEYS INVENTORS:
PETER T. GACS
LUCIEN C. WILLIAMS
BY: Bedell & Burgess
ATTORNEYS 3,722,017

OVER-THE-WING AIRCRAFT LOADING BRIDGE

BACKGROUND OF THE INVENTION:

1. Field of the Invention

The invention relates to loading bridges for aircraft and particularly to bridges constructed for positioning over the wing of an aircraft to provide access to loading doors rearwardly of the wing when the aircraft is positioned with its nose toward the terminal building.

2. The Prior Art

The only over-the-wing bridges found in the prior art are fixed height bridges, their fixed height being sufficient to clear an aircraft wing, rotatable about a vertical axis at their juncture with the airport terminal building and provided with a plurality of fixed lateral passageways fixedly positioned to register with access doors of the aircraft.

SUMMARY OF THE INVENTION

The invention provides an over-the-wing bridge capable of precise positioning horizontally and vertically to effect alignment of its outer end with an access door aft of the wing of an aircraft parked with its nose directed toward the terminal building.

It provides in such a bridge safety features, including the use of screw jacks synchronized with the hydraulic lifting system to assure maintenance of the selected height in the event of hydraulic system failure; and means for automatically raising the bridge in the event it too closely approaches the top of an aircraft wing.

It provides selective automatic vertical positioning of the bridge for different types of aircraft depending upon their wing height.

BRIEF DESCRIPTION OF THE DRAWINGS

FIG. 10 is a transverse vertical sectional view of the carriage along line 10—10 of FIG. 9.

FIG. 11 is a top view of main passageway vertical guide rollers and associated height control limit switch along line 11—11 of FIG. 12.

FIG. 12 is a side elevational view of the parts illustrated in FIG. 11.

FIG. 13 is a diagrammatic side elevational view of the wing trip wire safety mechanism.

FIGS. 14 and 15 are respectively side and bottom views, the latter from line 15—15 of FIG. 14, of the wing safety switch and the associated mounting bracket.

FIGS. 16 and 17 are respectively side and end views of the opposite end mooring of the safety wire to the main passageway member.

DESCRIPTION OF THE PREFERRED EMBODIMENT

Figure 1:
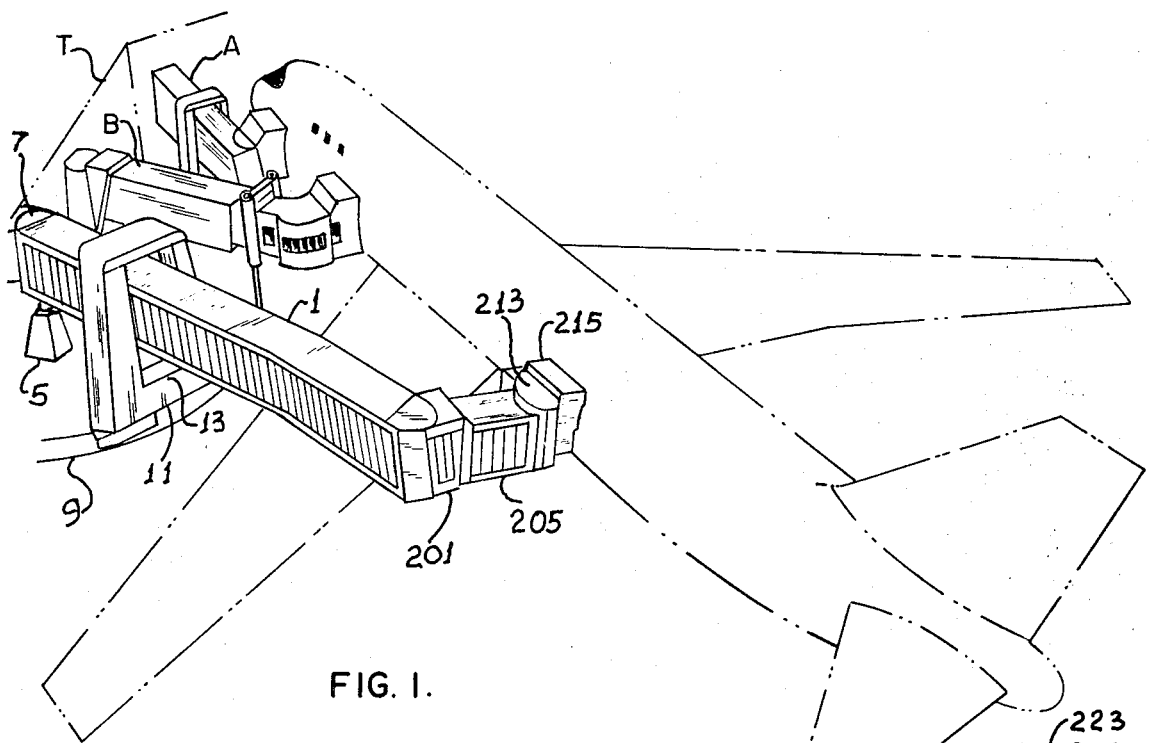
FIG. 1 is an environmental perspective view of an airport installation of a loading bridge embodying the invention.
Figure 2:
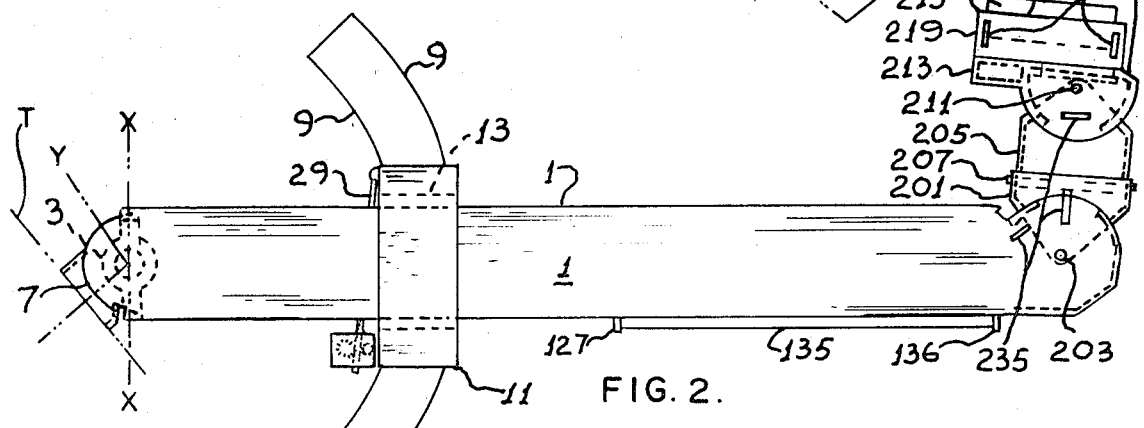
FIG. 2 is a plan view of the loading bridge illustrated in FIG. 1.

The numeral 1 generally indicates a rigid elongated tunnel-like main passageway member pivotally connected at one end on a transverse horizontal axis X to a pivot member 3 arranged to pivot about a vertical axis Y—Y on a stationary, ground supported pedestal 5, so that passageway member 1 can swivel in the horizontal plane and be elevated and depressed in the vertical plane about axes Y—Y and X—X respectively. A rotunda 7 provides a connecting passage between passageway member 1 and adjacent terminal building T.

For supporting passageway member 1 at a location radially outwardly of vertical axis Y—Y and providing desired swivel and elevation and depression of the passageway member, an arcuate track comprising radially spaced rails 9, 9 is curved about axis Y—Y on a radius approximately one-third of the length of passageway member 1, and a carriage 11 is movably mounted on track 9 and is radially apertured at 13 to permit the projection therethrough of passageway member 1.

Track rails 9 are arranged with their heads flush with apron pavement A which is laterally spaced from the rails on both sides to form double flangeways for each rail and carriage 11 is mounted on a pair of trucks 15 each mounting four double-flanged wheels 17 of the crane type, arranged with their axes radial about pivot axis Y—Y and rollably supported in pairs on rails 9 to permit movement of carriage 11 from end to end of track 9, 9 whereby to effect desired swivel of main passageway member 1. To prevent derailment or possible tipping of carriage 11, trucks 15 may be provided with safety elements each comprising a depending plate 21 to the lower end of which are bolted a pair of opposed transversely inwardly hooked members 23, the transversely inwardly directed ends 25 of which underlie the head of rail 9.

For shifting carriage 11 along track 9, 9 so as to position main passageway member 1 in selected positions angularly disposed with respect to each other about vertical pivot axis Y—Y, a lateral bracket 27 is secured to a radially inner, longitudinally outboard corner of the carriage, preferably to left hand truck 15, as viewed from the pivot, and a drawbar 29 is pivotally secured, by means of a vertical axis pin 31 to bracket 27 and extends therefrom generally parallel to carriage 11.

Along its side remote from the carriage, drawbar 29 is indented to form teeth 32 defining a rack extending part of the length of the drawbar, and a stationary drive mechanism 33 for translating the rack is mounted on the apron pavement A radially inwardly of inner track rail 9 and approximately halfway between the center of the track and its right hand end, as viewed from the region of pedestal 5.

The rack drive mechanism 33 comprises an electric motor 35 of the type having an integral eddy current brake which regulates the motor speed by alternate braking and clutching. Below the motor a disc brake 37 is connected to the motor output shaft 39, which in turn is connected by flexible coupling 41 to a reduction gear box 43, the output of which drives a pinion 45, which is journaled on a vertical axis at 47 in pinion housing 49. Housing 49 is apertured at 51 to permit the passage through it of drawbar 29, teeth 32 of which mesh with the teeth of pinion 45. A roller 53 rotatably mounted in housing 49 engages the smooth side of drawbar 29 opposite the toothed side and maintains teeth 32 in constant drivable engagement with pinion 45 whereby, when motor 35 is energized to drive pinion 45, the latter causes translation of drawbar 29 and corresponding movement of carriage 11 along track 9, 9, and corresponding pivotal movement of main passageway 1 about its vertical pivot axis Y—Y.

Torque disc brake 37 is preferably an electromechanical brake of the type used on many airport baggage handling systems in which the friction discs mounted on the brake hub engage the brake pressure plate when the pressure of a torque spring is electrically released. If electrical power fails or is not available to operate the brake, it will automatically release and remain released until electric power is restored.

The horizontal drive system described above permits precise positioning of main passageway member 1 in the horizontal plane, and permits it to be so positioned by external means in the event of power failure.

Figure 4:
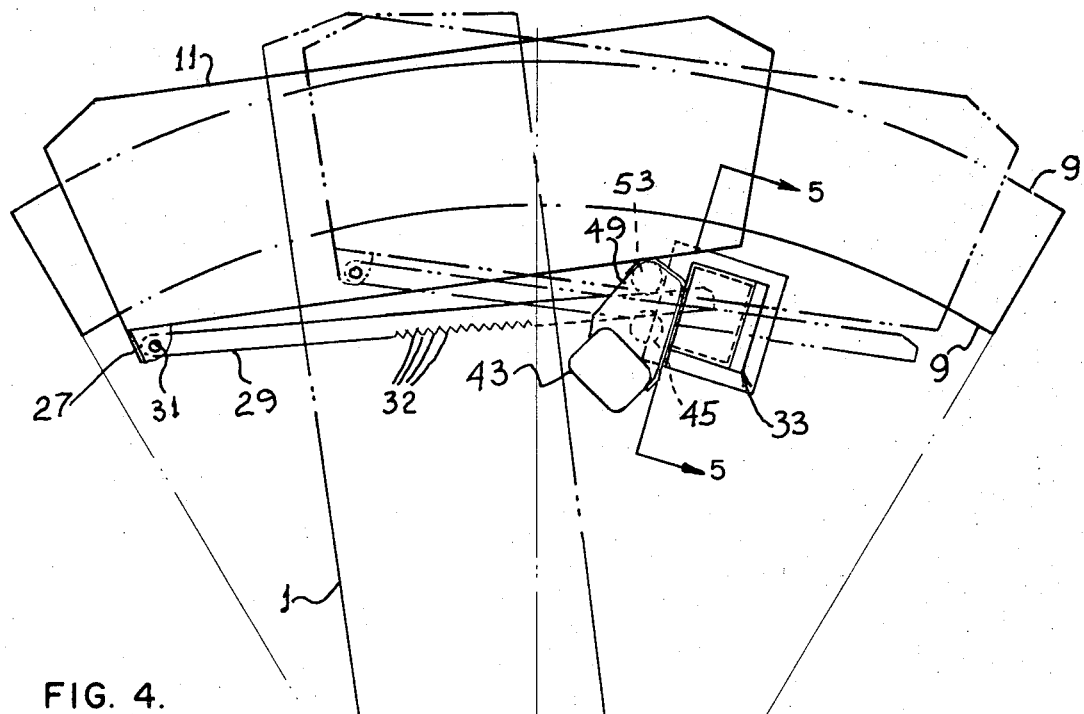
FIG. 4 is a plan view showing the tranversing mechanism of the bridge.
Figure 5:
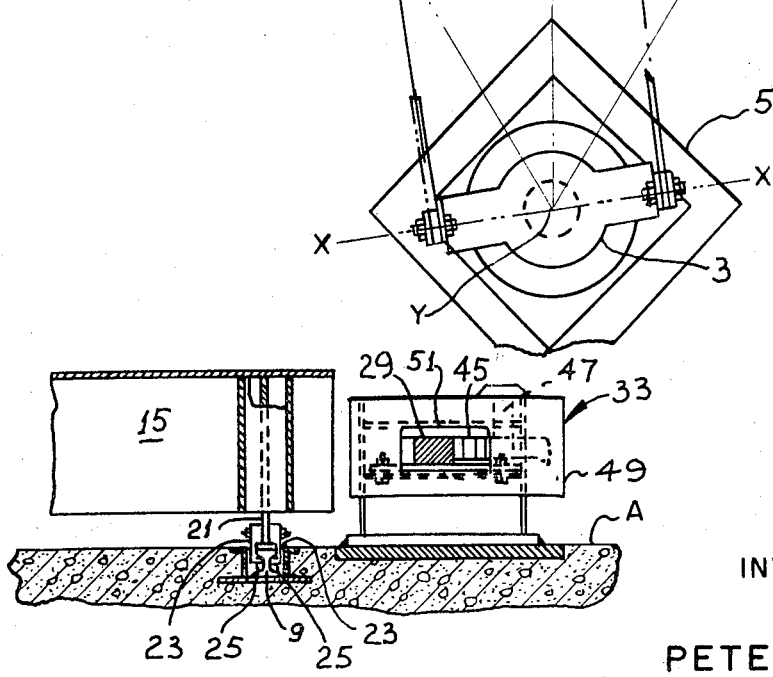
FIG. 5 is a vertical sectional view along line 5—5 of FIG. 4.
Figure 6:
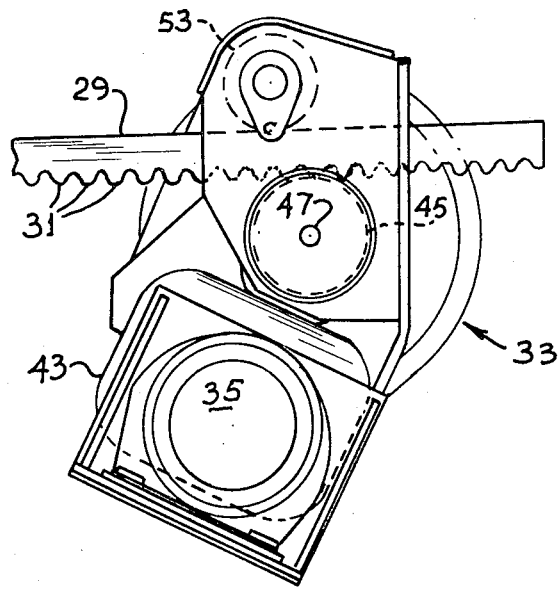
FIG. 6 is a plan view of the horizontal drive mechanism.
Figure 7:
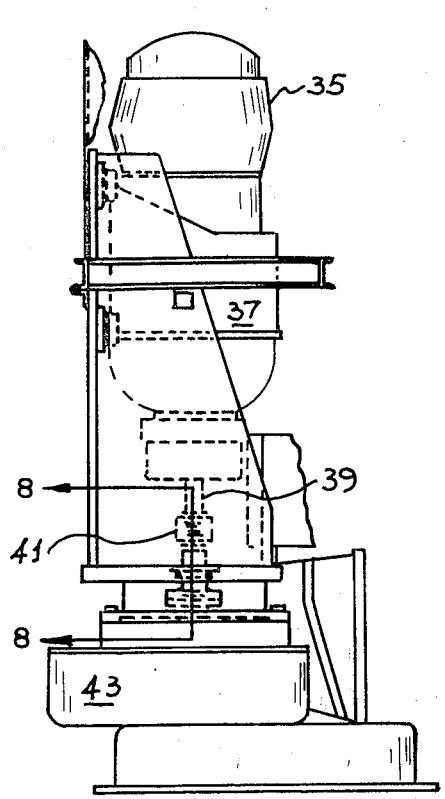
FIG. 7 is a side elevational view of the horizontal drive mechanism.

For elevating and depressing the main passageway member 1 about its transverse horizontal pivotal axis X-Y carriage 11 (FIGS. 4 and 5) includes a pair of transversely spaced longitudinally extending I-beam sills 61 rigidly secured at their ends to the tops of trucks 15, and a pair of columns 63, 63 spaced apart longitudinally of the carriage (transversely of the main passageway member) and connected at their tops by lintel beam 65 and at their lower ends by sills 61 to define aperture 13 through which main passageway member 1 passes.

Columns 63 are of inwardly open channel cross section and mount inwardly facing parallel guide plates for main passageway member 1, which includes framing comprising transversely spaced vertical side member 67, transverse bottom member 69 and transverse top member 71.

For positioning passageway member 1 transversely between columns 63, side members 67 mount outwardly projecting pairs of clevis-like brackets 68 spaced apart vertically and having their axes respectively radial with respect to the main passageway transverse pivot axis X—X. Rollers 70 journaled respectively on these axes engage guide plates 65 to center the passageway in aperture 13 and facilitate its generally vertical movement therein on an arc concentric with axis X—X.

For supporting main passageway member 1 on carriage 11 and elevating and depressing it along an arc about axis X—X, a hydromechanical system, comprising a hydraulic cylinder 75 and two pairs of self-locking mechanical screw jacks 77, is provided. Cylinder 75 is generally centered longitudinally of the carriage and the pairs of screw jacks 77 are disposed symmetrically on both sides of cylinder 75, each pair having a cylindrical housing 79. At their upper ends screw jack housings 79 are rigidly connected by a beam 81, to which cylinder 75 is also rigidly connected, to form a rigid jacking assembly, and at their lower ends each of the jack housings 79 and cylinder 75 is formed with a depending clevis 83. The common axis of clevises 83 extends longitudinally of carriage 11, and three transverse plates 85 secured at their ends to sills 61 pass respectively through the jaws of clevises 83, and support the latter by pins 87.

At their upper ends, piston 89 of hydraulic cylinder 75 and screw jacks 77 mount upwardly open clevises 91 with their common axis extending lengthwise of carriage 11, and plate-like brackets 93 depending from passageway member transverse beam 69 are received in the jaws of clevises 91 and connected thereto by pins 95. By thus pivoting the jack assembly 75, 79, 81 to the carriage and to the passageway member support beam 69, the latter is permitted to follow an arcuate path about axis X—X during elevation and depression of the main passageway member.

The power source of hydraulic cylinder 75 is a hydraulic pump 97 driven by an electric motor 99, both supported from sills 61 within the base of right hand column 63. Hydraulic pump 97 is connected through a solenoid actuated reversing valve shown symbolically at 98 by conduits 101 to cylinder 75 so as to introduce hydraulic fluid into cylinder 75 when valve 98 is set in one direction, and thereby elevate piston 99 and to remove fluid from cylinder 75 and thereby lower piston 89 and passageway member 1, when solenoid reversing valve 98 is reversed.

Screw jacks 77 are raised and lowered by threaded collars 105 driven by motor 107 mounted on platform 81, and connected to collars 105 by shafts 109 and miter gear boxes 111.

The operation of motor 99 driving hydraulic pump 97, solenoid reversing valve 98, and motor 107 driving jacks 77 is synchronized electrically such that the operation of hydraulic cylinder 75 and jacks 77 are correspondingly synchronized, the elevation of the main passageway member 1 being effected by the hydraulic system, screw jacks 77 serving solely as safety supports and to provide additional lateral stability to the main passageway member.

To permit elevation of the main passageway member, if that becomes necessary in the event the hydraulic system is disabled, an auxiliary motor 112 is also mounted on platform 81 and connected to the jack drive shaft by a manually actuated clutch 113, so that its torque can be used, in addition to the torque supplied by main drive motor 107 to activate the screw jacks.

Figure 3:
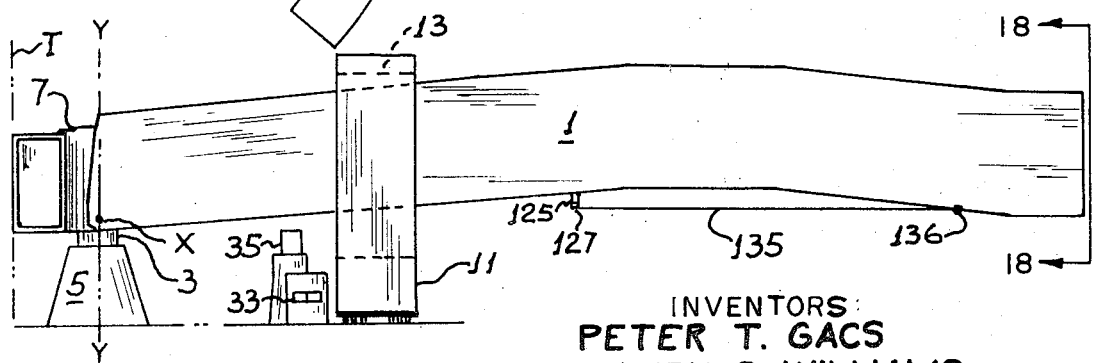
FIG. 3 is a side elevational view of the bridge illustrated in FIGS. 1 and 2.

As will be particularly evident from FIGS. 1 and 3, the portion of main passageway member 1 projecting outwardly from carriage 11 is slightly arched to clear the wing of any aircraft it is used to load and provide access to a loading door thereof aft of the wing, this portion of the passageway being cantilevered from its support on carriage 11.

Figure 8:
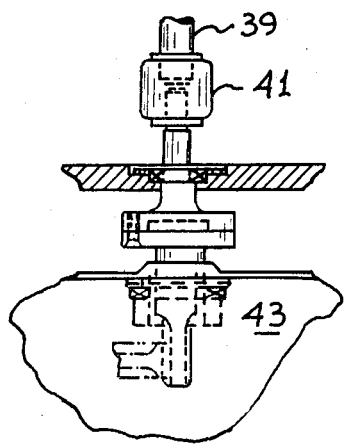
FIG. 8 is a fragmentary vertical sectional view along line 8—8 of FIG. 7.
Figure 9:
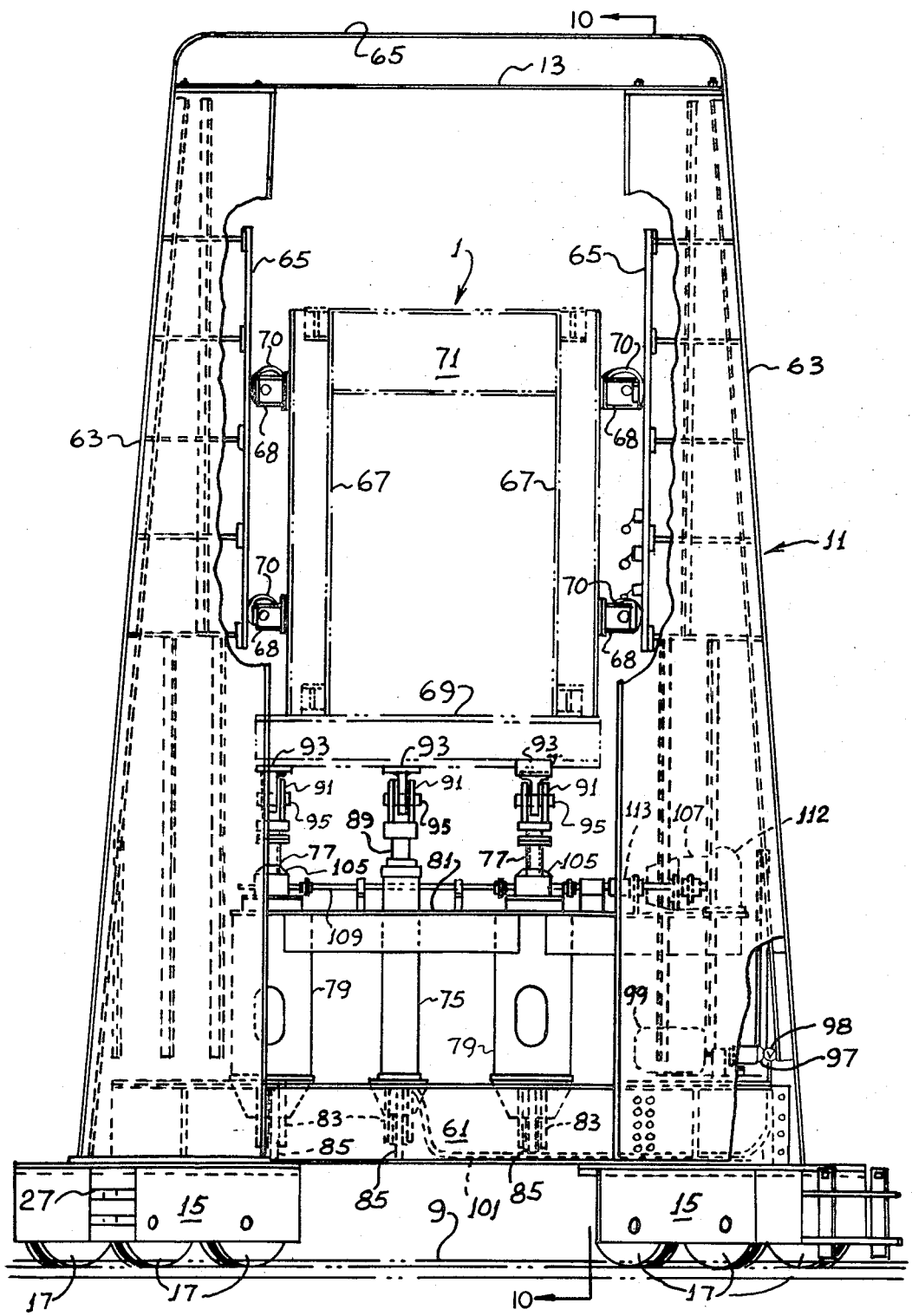
FIG. 9 is a side elevational view of the bridge support carriage.
Figure 18:
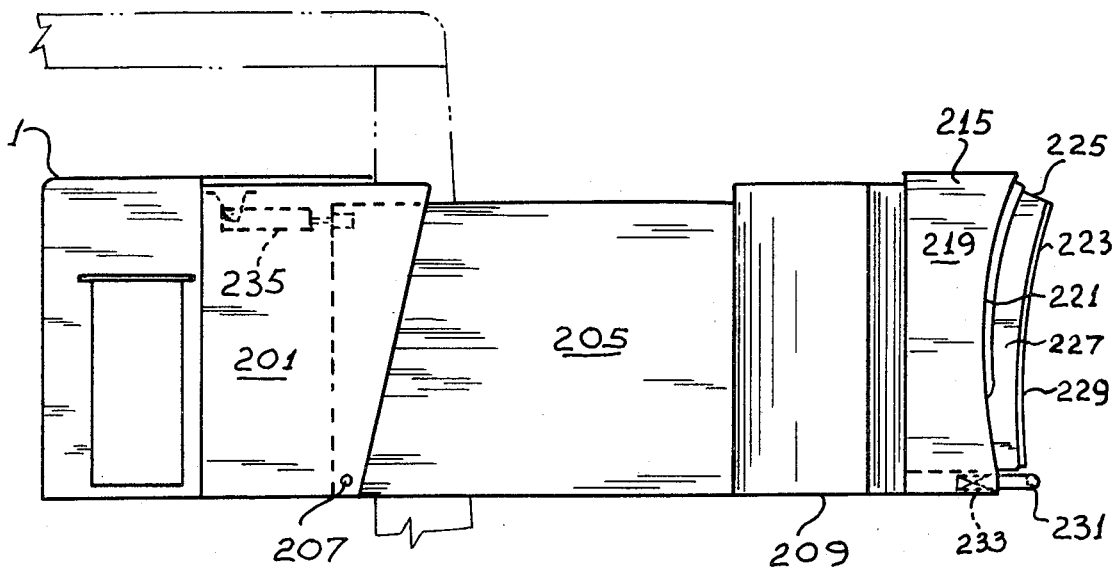
FIG. 18 is an outer end elevational view of the bridge, taken from line 15—15 of FIG. 3.

To provide for automatic stopping of the jacking mechanism when the passageway member reached its normal stowed height or the proper height for a given aircraft, e.g., a 707, 747 or DC-10, a series of microswitches 117 are mounted on right hand guide plate 65 (see FIGS. 5, 8 and 9 particularly) and their operating arms 119 are provided with rollers 121, operatively engageable, respectively, with a cam 123 mounted on lower guide roller bracket 68, when the main passageway reaches the proper height to clear a selected aircraft wing. When the cam engages the selected switch, the latter closes, energizing a normally closed relay 122 to open the electrical circuits including hydraulic pump motor 99 and screw jack main drive motor 107, stopping these motors and halting the main passageway at the desired level.

While limit switches 117 are arranged to stop downward movement of the main passageway at the proper level to clear the respective aircraft wing, in the event the wing should be at a higher than normal level as the result of landing gear failure, a flat tire or other abnormal condition, safety means is provided to interrupt the downward movement, and raise the passageway member a predetermined distance, preferably about four inches, as the passageway member approaches engagement with the wing.

The safety means comprises a bracket 125 depending from the main passageway member and terminating in a transverse angle section support element 127. A transversely extending inverted channel section frame 129 is secured by its rear flange 131 to element 127, and a microswitch 133 is mounted on the rear web of frame 129. Switch 133 is normally open and is operatively connected to relays which when energized initially open the circuits energizing screw jack motor 107 and hydraulic drive motor 99 to prevent further downward movement, and then reverse these motors to initiate limited upward movement. For closing microswitch 133 when main passageway member 1 gets closer than a predetermined distance to the top of a wing, a wire 135 is fixedly secured at 136 to a transversely projecting member 137 on the bottom of the main passageway member 1 on the outboard end of the arched portion thereof, and the inner end of wire 135 passes through the forward flange 138 secured to a clevis-like projection 139 at the center of an attachment plate 141 in bracket 129. Attachment plate 141 is cylindrically apertured at 143 on both sides of projection 139 and rides on sleeves 145 which extend between bracket flanges 138 and 131 through the attachment plate apertures. Compression coil springs 147 surround sleeves 145 and are seated against bracket forward flange 138 and bear against plate 141 to urge the same rearwardly and maintain wire 135 in tension across the arched portion of the passageway member. Plate 141 is provided with an adjustable arm 147 pivotally connected to operating arm 149 of microswitch 133 so that when wire 135 engages an aircraft wing during downward movement of the main passageway member, switch 133 will close, energizing time delay relays 134 to cause reversing valve 98 to move to the elevation position and to energize motors 107 and 99 to initiate limited upward movement of the main passageway member 1.

At its outer end main passageway member 1 mounts a yoke assembly 201 for rotation about a vertical axis defined by vertically aligned top and bottom pivot pins 203, the left hand side of the outer end portion of main passageway member 1 being open, and the yoke assembly being hollow to form a lateral passage. A lateral passageway member 205 of rectangular cross section is pivotally connected at one end by horizontal pin 207 extending transversely of the lower portion of member 205, to the bottom of the radially outer end of yoke 201, to permit the lateral passageway member to pivot vertically about pin 207.

At its radially outer end, lateral passageway member 205 mounts a generally semicylindrical outer end unit 209 by means of a pair of vertically aligned top and bottom pivot pins 211 on the outer end of the longitudinal center line of lateral passageway member 205, the end of the latter and a segment of cab 209 being suitably apertured to form a continuous passageway therethrough. Cab 209 is formed with a radial arm and a canopy housing section 215 rectangular in plan and vertical cross section, with its radially outer side 217 entirely open. The outer edges 221 of its vertical side walls 219 are of generally concave arcuate shape to conform generally with the convex arcuate side of an aircraft fuselage.

To provide a seal between the cab and the aircraft fuselage, a canopy 223 is telescopingly received in canopy housing section 215 of the cab member. Canopy 223 has a top wall 225 and side walls 227 and its leading edge mounts a vinyl covered foam bumper 229 adapted to conform closely to the contour of the aircraft fuselage. The outer marginal portion of the cab floor indicated at 231 is biased outwardly by springs 233, which may be mounted in a suitable pocket beneath the cab floor and are arranged to provide a continuous floor surface up to the surface of the aircraft fuselage.

Preferably hydraulic cylinders 235 are provided for horizontal rotation of lateral passageway 205 about pivot pins 203, vertical pivoting along pins 207, rotation of cab 209 about pins 211 and projection and retraction of canopy 223.

It will be evident from FIG. 1 that the over-the-wing bridge described herein can be used in combination with other types of aircraft loading bridges, such as those illustrated at A and B for providing communication between the terminal building T and aircraft access doors forward of the wing, to provide additional communication with doors aft of the wing and thus accelerate the loading and unloading of larger aircraft.

Operation of the over-the-wing bridge is as follows: With the bridge in its normal position, i.e., with the main passageway member 1 elevated to the maximum or stowed height, with carriage 11 at the right hand end of track 9, 9, and with an aircraft in a position comparable to that of FIG. 1, the operator in cab 209 selects the bridge height for the particular aircraft, thereby cutting the appropriate vertical limit switch 117 into the circuits controlling hydraulic pump drive motor 99 and screw jack drive motor 107 which energizes these motors to lower the main passageway member until cam 123 on guide roller bracket 69 actuates switch 117 to open the vertical drive circuit and stop the main passageway member at the selected height. The operator then energizes horizontal drive motor 35 to drive toothed drawbar 29 to the left and thereby push the carriage and the bridge toward the aircraft until the bridge canopy 223 is close (approximately three feet away) to the fuselage. Hydraulic cylinders 235 are than first energized to rotate yoke 201 about pivot axis 203 and lateral passageway 205 about pivot axis 207 to align the lateral passageway generally with the aircraft access door, and thereupon energized to rotate cab 209 into general parallelism with the side of the aircraft fuselage. The horizontal drive motor 35 is again energized to move the bridge arcuately on the track 9, 9 until the spring loaded marginal portion 231 of the cab floor against the fuselage, after which hydraulic cylinders 235 are energized to advance the canopy until its resilient rim 229 is in sealing engagement with the fuselage.

Return of the bridge to stowed position is effected by cutting the stowed position microswitch into the circuits controlling hydraulic pump drive motor 99 and screw jack drive motor 107 and energizing these circuits to operate the jacks and hydraulic cylinder upwardly. When main passageway member 1 reaches the stowed position height (FIG. 10), cam 123 (FIGS. 11 and 12) on guide roller bracket 69 will engage follower roller 121 on the stowed position limit switch 117, actuating the switch to open the screw jack and hydraulic pump drive circuits and thereby halting the main passageway member at the vertical stowed position. Horizontal drive motor 35 is then energized to drive drawbar 29 to pull carriage 11 to the horizontal stowed position at the right hand end of track 9, 9.

The details of the structure may be varied substantially without departing from the spirit of the invention and the exclusive use of those modifications coming within the scope of the claims is contemplated.

I claim:

1. A bridge for transferring passengers to aircraft comprising a main passageway member pivotally supported at one end on vertical and transverse axes and mounting a lateral passageway on its other end for pivotal movement about a vertical axis and about an axis transverse of said lateral passageway for alignment with an aircraft access door when said main passageway is generally parallel to the aircraft fuselage, a carriage movable horizontally in an arcuate path curved about said main passageway vertical pivot axis, said main passageway being supported intermediate its ends on said carriage, an arcuate track for guidingly supporting said carriage, and ground supported stationary power means for propelling said carriage to selected positions along said track, a drawbar pivotally secured to said carriage and extending in a direction generally parallel thereto, said drawbar being formed with teeth defining a rack along one of its longitudinal sides, said power means comprising a pinion in meshed relation with said rack, and a motor drivingly connected to said pinion, means engaging the longitudinal side of said drawbar opposite the toothed rack side and urging said teeth into constant meshed relation with said pinion, said power means including a brake for immobilizing said pinion and said rack and holding said carriage in selected positions arcuately of said track when said motor is deenergized.

2. A bridge for transferring passengers to aircraft comprising a main passageway member pivotally supported at one end on vertical and transverse axes and mounting a lateral passageway on its other end for pivotal movement about a vertical axis and about an axis transverse of said lateral passageway for alignment with an aircraft access door when said main passageway is generally parallel to the aircraft fuselage, a carriage movable horizontally in an arcuate path curved about said main passageway vertical pivot axis, said main passageway being supported intermediate its ends on said carriage, said carriage including power means for elevating and lowering said main passageway member about said main passageway member transverse horizontal axis, said elevating power means comprising a hydraulic cylinder, a piston therein, a hydraulic pump, an electric motor drivingly connected to said pump, conduit means connecting said pump and said cylinder, electrically operated direction reversing valve means in said conduit, screw jacks, an electric motor drivingly connected to said screw jacks, said pump motor and reversing valve being electrically synchronized with said screw jack motor to provide simultaneous raising and lowering of said hydraulic piston and said screw jacks.

3. A bridge according to claim 2 including a vertical guide member on said carriage for said main passageway member, a plurality of electric limit switches on one of said main passageway and guide members respectively at different heights, a contact element on the other of said main passageway and guide members engageable with respective limit switches when said main passageway member is at the corresponding height, said limit switches being selectively connectible to said elevating power means motor circuit to open the same and halt vertical movement of said main passageway member when a selected limit switch is engaged by said contacting element.

4. A bridge according to claim 2 including safety means on the bottom of said main passageway member in the region normally adapted to overlie an aircraft wing for energizing said hydraulic pump drive motor and screw jack drive motor to raise said main passageway member a predetermined distance if the vertical distance between the top of the wing and the bottom of said main passageway member becomes less than a predetermined value.

5. A bridge according to claim 4 wherein said safety means comprises a tension-responsive electric switch, a flexible tension member extending lengthwise of said main passageway member below the same and secured at its one end to said main passageway member and operatively connected at its other end to said switch, and means electrically connecting said tension responsive switch to said hydraulic pump drive motor and said screw jack drive motor to energize the same to elevate said hydraulic piston and said screw jacks a predetermined distance.

6. In a bridge for transferring passengers to aircraft comprising a main passageway member, power means for selectively raising and lowering said main passageway member, said power means comprising a hydraulic cylinder, a piston therein, a hydraulic pump, an electric motor drivingly connected to said pump, conduit means connecting said pump and said cylinder, electrically operated direction reversing valve means in said conduit, screw jacks, an electric motor drivingly connected to said screw jacks, said pump motor and reversing valve being electrically synchronized with said screw jack motor to provide simultaneous raising and lowering of said hydraulic piston and said screw jacks.

7. In a bridge according to claim 6, a vertically stationary guide member for said main passageway member, a plurality of electric limit switches on one of said main passageway and guide members respectively at different heights, a contact element on the other of said main passageway and guide members engageable with respective limit switches when said main passageway member is at the corresponding height, said limit switches being selectively connectible to said elevating power means motor circuit to open the same and halt vertical movement of said main passageway member when a selected limit switch is engaged by said contacting element.

* * * * *